United States Patent [19]
Gelman et al.

[11] Patent Number: 5,904,808
[45] Date of Patent: May 18, 1999

[54] PROCESSES AND COMPOSITIONS FOR REPULPING WET STRENGTH PAPER AND PAPER PRODUCTS

[75] Inventors: Robert A. Gelman, Newark; Josette S. Hyunh-Ba, Hockessin, both of Del.

[73] Assignee: Hercules Incorporated, Wilmington, Del.

[21] Appl. No.: 08/714,432

[22] Filed: Sep. 16, 1996

[51] Int. Cl.$^6$ ................................................. D21C 5/02
[52] U.S. Cl. .............................. 162/7; 162/78; 162/191
[58] Field of Search ............................... 162/7, 191, 189, 162/78

[56] References Cited

U.S. PATENT DOCUMENTS

| | | |
|---|---|---|
| 2,926,116 | 2/1960 | Keim . |
| 3,427,217 | 2/1969 | Miller . |
| 5,447,602 | 9/1995 | Sajbel et al. . |

FOREIGN PATENT DOCUMENTS

| | | |
|---|---|---|
| 0585955 | 3/1994 | European Pat. Off. . |
| 9420682 | 9/1994 | WIPO . |
| 9505504 | 2/1995 | WIPO . |
| 9506157 | 3/1995 | WIPO . |

OTHER PUBLICATIONS

Henk A97 95–106876/14, Polymer Applications–p. 14, week 9514 (abstract of WO 95//06157).

Thorp, et al., "Chlorine–Free Wet Strength Paper Repulping and Decolorizing with Activated Persulfates" *1995 Papermakers Conference: Proceedings (TAPPI)*; 163–168 (Apr. 26, 1995; TAPPI Press).

Espy, et al., Proceedings of the TAPPI Papermakers Conference–1990, pp. 147–149.

Espy, et al., "Persulfates as Repulping Reagents for Neutral/Alkaline Wet–Strength Broke", *TAPPI J.*, vol.: 76, No.: 2, pp. 139–142 (1993) CA.

Hercules Incoporated KYBREAK* 100 Repulping aid Material Safety Data Sheet dated May 28, 1993.

Hercules Incorporated KYBREAK* 200 Repulping aid Material Safety Data Sheet dated Jan. 10, 1994.

Hercules Incorporated KYBREAK* 300 Repulping aid Material Safety Data Sheet dated May 3, 1995.

Hercules Incorporated Product Product Data sheet, entitled "KYBREAK™ 100 Repulping Aid For Paper and Paperboard Containing Alkaline–Curing, Wet–Strength Resins".

Hercules Incorporated Product Data Sheet, entitled, "Kybreak™ 200 Repulping Aid For Paper and Paperboard Containing Alkaline–Curing, Wet Strength Resins".

Hercules Incorporated Product Data sheet, entitled, "KYBREAK™ 300 Repulping Aid For Paper and Paperboard Containg Alkaline–Curing, Wet–Strength Resins".

Laporte Organics Product Specification sheet, entitled, "Sodiumpersulfate" and a verified English translation thereof.

Thirkettle, Broke Handling, *Paper Review of the Year*, Johnsen, Jorgenson & Wettre, Ltd., 1974 (pp. 126–136).

*Primary Examiner*—Peter Chin
*Attorney, Agent, or Firm*—Greenblum & Bernstein, P.L.C.

[57] ABSTRACT

A process of repulping paper a product comprising cellulose fibers, comprising forming an aqueous suspension of paper product to be repulped and an oxidizing agent comprising at least one persulfate salt, and maintaining the pH of the aqueous suspension in a range of from about 2.3 to about 6.5. The process is preferably conducted in the presence of preferred buffer systems. Compositions for conducting such processes are also provided.

33 Claims, No Drawings

PROCESSES AND COMPOSITIONS FOR REPULPING WET STRENGTH PAPER AND PAPER PRODUCTS

BACKGROUND OF THE INVENTION

1. Field of the Invention

The present invention is related to processes and compositions for repulping wet strength paper and paper products such as paperboard and the like, and in particular to repulping such materials which exhibit increased wet strength by virtue of having added thereto a wet strength resin.

2. Description of Background Information

Paper and paperboard are ubiquitous in our society, where these products are employed in numerous applications. Paper is an ideal material, not only for its functionalities, but also for its ability to be recycled. Its inherent recyclability is an important factor in today's market.

Paper is recycled via a process called repulping, wherein the cellulose fibers that comprised the original sheet are separated. These fibers can be cleaned, treated, redispersed, and prepared into a pulp slurry essentially similar to that used to make the original sheet. The normal papermaking process is then followed to form a sheet made from recycled fibers. The process of repulping involves mixing, under shear, in water. Chemicals may be added to accelerate the process; and elevated temperatures are often used.

Paper is made to provide specific functional properties. Chemicals are often added to impart and/or enhance these properties. Amongst the more widely used additives are wet strength resins. These chemicals act to provide strength to wet paper and are used in, among other paper products, paper towel and packaging.

Repulping paper containing a wet strength resin is difficult because the resin (such as a polyamide-epichlorohydrin resin) is added during paper production to enhance the strength of the paper produced so that the paper does not fall apart when used under wet conditions. The wet strength resin binds the cellulose fibers together, impeding the repulping process of separating the cellulose fibers. Typically, paper treated with wet strength resins will retain at least 15% of the dry strength of the paper when wet. Paper without wet strength resin generally retains only 2–7% of its dry strength when wet.

Oxidation facilitates the breakdown of the wet strength resin to permit separation of the cellulose fibers. Hypochlorite, particularly sodium hypochlorite, is typically used by paper mills in the repulping of wet strength paper to oxidize the wet strength resin to facilitate fiber separation. Hypochlorite oxidizes the wet strength resins within a narrow, carefully maintained pH range and within a temperature range of from about 122° F. (50° C.) to 158° F. (70° C.).

Environmental issues have been raised concerning the use of hypochlorite for repulping. These concerns relate to the formation of organic halides which are adsorbed by the pulp, chloroform emission, and the problem of adding chlorinated hydrocarbons to the effluent stream. For these reasons, non-halogen containing compounds, such as persulfates have been used to oxidize wet strength resin during the repulping process.

Thus, more recently it has been found that persulfate salts can be used to degrade the wet strength resin, facilitating the repulping process. Any persulfate salt, typically sodium, can be used. This material can also be used with alkali metal, alkaline earth metal, or ammonium salts of carbonate, bicarbonate or sesquicarbonate to enhance repulping performance. Mixtures of persulfate and carbonate, bicarbonate or sesquicarbonate can be prepared which do not separate in storage containers, and which exhibit substantially increased handling safety over persulfate alone.

In general, however, systems employing persulfate salts are slower than hypochlorite or similar systems. Moreover, the introduction of additional heat, beyond that used with hypochlorite, is generally required for repulping suspensions employing such persulfate salts, in order to accelerate the degradation of the wet strength resins to a commercially-acceptable rate.

WO 94/20682 A1 discloses a composition containing a persulfate and a carbonate, bicarbonate or sesquicarbonate for use in oxidizing wet strength resin containing paper. The present invention accelerates the action of this material.

U.S. Pat. No. 3,427,217 discloses a process for repulping wet-strength broke containing wet-strength resin which comprises slurrying the broke in a dilute aqueous solution of an inorganic oxidizing agent. The oxidizing agent is selected from a group which includes persulfates.

WO 95/05504 A1 discloses a formulation for repulping and/or decoloring broke comprising 51–94 wt % persulfate; 4–43 wt % pH adjuster; 0.05–6 wt % soluble catalyst selected from one or more of a soluble salt of Cu, Fe, Ag and Ni; and 0–10 wt % of a saccharide which has no greater ability to reduce the catalyst than does D-mannitol. This document also relates to a method for repulping and/or decolorizing broke. Preferably the pH adjuster is a base selected from alkali metal, alkaline earth metal or ammonium salts of carbonate, bicarbonate or sesquicarbonate. The catalyst is a Cu salt. The saccharide is ascorbic acid, D-sorbitol and/or D-mannitol. It is stated that the composition permits separation of the fiber without destruction of the cellulose, yet permits alerting the chromophore to decolorize. The composition is said to effectively meet environmental requirements. The pH range of the solutions of Example 1 are relatively high, and the control of pH by the use of a buffer or other means is not disclosed.

THORP, et al., "Chlorine-Free Wet-Strength Paper Repulping and Decolorizing with Activated Persulfates", 1995 *Papermakers Conference: Proceedings (TAPPI)*; 163–168 (Apr. 26, 1995; TAPPI Press) discloses a sodium persulfate mixture containing an activated persulfate catalyst used in laboratory trials carried out on wet-strength broke that investigated the use of activated persulfates for repulping and decolorizing papers treated with neutral/alkaline wet-strength resins. Reaction time, persulfate concentration, temperature, and pH were identified as the critical process parameters in optimizing repulping performance. Paper additives, lignin content, dye chemistry, and mechanical agitation were also found to affect persulfate performance. Page 165 discloses that wet strength broke is most effectively repulped by activated persulfates under alkaline conditions. This page also states that a pH range of 9–11 usually yields the best repulping results.

It is known that the ratio of persulfate to base can be adjusted to provide a neutral, acidic, or basic pH during the repulping process for the oxidation of the wet strength resin. Such pH regulation by adjustment of the persulfate to base ratio in the combined product avoids the need for an additional process step for pH adjustment and permits a single package chemical treatment for repulping. Repulping using persulfate is conducted under alkaline conditions, because conventional wisdom dictates that repulping using persulfates is optimal, for example faster, under alkaline conditions.

For Example, ESPY, et al., "Persulfates as Repulping Reagents for Neutral/alkaline Wet-strength Broke", *Tappi J.*, Volume: 76 Number: 2, pages 139–42 (1993) CA: 119(10) 98260h discloses alkali metal persulfates have been found to repulp neutral/alkaline wet strength broke. Persulfate salts defiber paper made with polyamide-epichlorohydrin resins, although slower than hypochlorite salts. Persulfate salts are said to be an acceptable substitute for hypochlorite because they do not generate organic chlorides in pulping effluents. Persulfate salts are especially effective in broke made with polyamide- or polyamine-epichlorohydrin wet-strength resins. Temperature and pH conditions are also described.

ESPY, et al., Proceedings of the TAPPI Papermakers Conference—1990, pg. 147–149, discloses that repulping is much faster under alkaline and neutral conditions than acidic conditions (pH 4). The pH of the suspension or system appears to vary considerably throughout the process and is not held or maintained substantially constant throughout the process. H. H. Espy and G. W. Geist, TAPPI Journal, pp. 139–142, Vol 76, Nov. 2, 1992, which is a related version of the foregoing, presents similar disclosure.

WO 95/06157 A1 discloses a process for repulping wet strength paper in which the initial breakdown is conducted at one pH; with substantial completion at a second, and high pH. The first pH value is no higher than 8, but is said to be typically about 8 (page 4, line 25), and preferably in the acidic range, and the pH adjusting agent for the first pH value is said to be typically an organic acid such as acetic acid, or an inorganic acid such as hydrochloric acid or sulfuric acid. The pH may be as low as 3 (Table 1, page 8) or 4 (Table 2, page 11, and Table 3, page 13). The pH is not controlled by a buffer solution, and the efficacy is undesirable.

U.S. Pat. No. 5,447,602 (which is a family member of WO 95/06157 A1 discussed above) discloses a process for repulping wet strength paper containing a wet strength resin. The process comprises (a) repulping the wet strength paper in a slurry containing an oxidizing agent and having a first pH to initiate breakdown of the paper to fibers; and (b) repulping the slurry at a second pH which is higher than the first pH until conversion of the wet strength paper is substantially complete. The process is said to be especially useful for repulping bleached paper and unbleached paper broke or corrugated containers.

EP 585 955 A1, a patent application of Hercules Incorporated, discloses the use of a non-chlorinating oxidizing agent and a water soluble buffering salt that is capable of maintaining pH between 7 and 12.

THIRKETTLE, "Broke Handling", *Paper Review of the Year*, Johnsen, Jorgensen & Wettre, Ltd., 1974 (pp. 126–136) discloses various aspects of handling "broke" (i.e., paper trimmings, scrap, and similar surplusage resulting from paper manufacture), including broke repulping. This document specifically teaches that repulping of broke treated with agents such as KYMENE 557 can be most efficiently accomplished under alkaline conditions at a pH of 10.5 and a temperature of 120° F.

Each of the foregoing approaches suffers from disadvantages. For example, repulping using persulfates and similar agents is generally slower than repulping with hypochlorites, and so the use of persulfates also includes a sacrifice in speed, efficacy and efficiency.

Accordingly, the foregoing approaches have failed to provide processes and compositions which exhibit the desired degree of effectiveness, rapidity and simplicity, and there has been a continuing need for improvement.

SUMMARY OF THE INVENTION

Accordingly, it is an object of the invention to provide a process for repulping paper and paper products, and, especially wet strength paper, paper products such as broke, paperboard, packaging materials and the like, which is effective and relatively rapid, even when such materials to be repulped have been treated with one or more wet strength resins, such as a polyamide-epichlorohydrin resin.

It is a further object of the invention to provide such a process which is efficacious, rapid and efficient, and yet at the same time also avoids the requirement of using hypochlorites and similar oxidizing agents.

It is a yet further object of the invention to accelerate the known action of persulfate, allowing either faster repulping, repulping at lower temperatures, or a combination thereof.

A further object of the invention is to provide a composition for repulping such paper and paper products in methods such as those set forth above.

A still further object of the invention is to provide such a composition which permits a single-package chemical treatment for repulping.

These and other objects of the invention are achieved by providing a process of repulping paper and/or a wet strength paper and/or a product comprising cellulose fibers, and/or similar paper products or products such as paper board, etc., which have or have not been previously treated with a wet strength resin, for example, a polyamide-epihalohydrin resin, especially a polyamide-epichlorohydrin resin.

The process comprises forming an aqueous suspension of paper product to be repulped and an oxidizing agent, preferably an oxidizing agent comprising a persulfate, and repulping the paper product in aqueous suspension while maintaining said suspension at a pH in a range of from about 2.3 to about 6.5. In other preferred embodiments of the invention, the pH is maintained at a range of from about 3.6 to about 5.8, preferably from about 4.8 to about 5.8, and more preferably in the range of from about 5.0 to about 5.5.

Preferably, the pH of the aqueous suspension is maintained within these ranges throughout a substantial portion of the repulping process; preferably, throughout substantially the entire repulping process, as defined below. In certain preferred aspects of the invention, the repulping is accomplished by the use of an oxidizing agent, preferably a persulfate oxidizing agent as defined below, and a buffer or buffer system.

In preferred embodiments, the repulping is conducted in the presence of a buffer which is capable of maintaining the foregoing pH ranges. An especially preferred buffer comprises a buffer system comprising an acetate salt and acetic acid, preferably an alkali metal acetate, such as sodium or potassium acetate, and acetic acid.

In still other preferred embodiments the repulping is also conducted in the presence of an additional salt comprising a member selected from the group consisting of an alkali metal, alkaline earth metal or ammonium salt of carbonate, bicarbonate or sesquicarbonate, and mixtures thereof.

Preferably, the repulping is conducted at a temperature in the range of from about 20° C. to about 90° C., more preferably from about 25° C. to about 80° C. and more preferably from about 40° C. to about 70° C.

In accordance with other aspects of the invention, the foregoing objects are attained by providing a composition for conducting such repulping. Such compositions according to the invention comprise A) an oxidizing agent; and B) a buffer capable of maintaining a pH of an aqueous suspension in a range of from about 2.3 to about 6.5.

Preferably, the buffer is a buffer system comprising an acetate salt and acetic acid, and the oxidizing agent comprises a persulfate salt, preferably a member selected from the group consisting of alkali metal persulfate, alkaline earth metal persulfate and mixtures thereof, more preferably the persulfate salt comprises a member selected from the group consisting of sodium persulfate, calcium persulfate and mixtures thereof. Most preferably the persulfate salt comprises sodium persulfate.

The compositions can further comprise an additional salt comprising a member selected from the group consisting of an alkali metal, alkaline earth metal or ammonium salt of carbonate, bicarbonate or sesquicarbonate, and mixtures thereof.

DETAILED DESCRIPTION OF PREFERRED EMBODIMENTS OF THE INVENTION

It has been unexpectedly discovered that wet strength paper and paper products comprising cellulose fiber, with or without wet strength resin, can be efficaciously repulped, preferably in the presence of an oxidizing agent, at a relatively low pH, or under relatively acidic conditions. This result is unexpected, in view of the fact that conventional wisdom dictates that repulping of wet strength paper and paper products comprising cellulose fiber and wet strength resin should be conducted under alkaline conditions, i.e., conditions of relatively high pH.

Typical materials which are amenable to being repulped in accordance with the present invention include wet strength paper (paper which has had one or more wet strength resins added to the starting or intermediate materials, such as during the manufacture thereof), and paper products comprising cellulose which have been treated with a wet strength resin (as in during manufacture), for example. Examples of such products include paper toweling, paperboard, egg cartons, cardboard, corrugated cardboard, and other similar paper packaging materials, among many others. In addition to the foregoing, the invention also applies to repulping broke (i.e., trimmings, cuttings or similar waste resulting from the manufacture of paper products, including the manufacture of any of the foregoing products).

All of the foregoing materials are defined as being suitable for repulping and are collectively referred to herein as "cellulosic products" or "paper products comprising cellulose fibers".

Examples of typical wet strength resins include polyamide-epichlorohydrin type resins. Such resins are well known to those of ordinary skill in the art. For example, such resins are disclosed in U.S. Pat. No. 2,926,116, the disclosure of which is hereby incorporated by reference as though set forth in full herein, and are commercially available from Hercules Incorporated under the tradename KYMENE wet strength resins.

In general, the oxidizing agent, or agents employed are those effective to degrade wet strength resin under repulping conditions. The oxidizing agents suitable for use with the present invention are readily available from commercial suppliers. Persulfate salts are included in the preferred oxidizing agents according to the present invention. Any persulfate salt can be employed. However, alkali metal persulfates and alkaline earth metal persulfates are preferred, with sodium and/or calcium persulfate being the preferred choices among these persulfate salts. Ammonium persulfate can also be employed. Suitable oxidizing agents are sold as repulping aids by Hercules Incorporated under the tradename KYBREAK.

Preferred oxidizing agents can comprise, for example, alkaline metal persulfates, e.g., sodium persulfate, alone or in combination with other inorganic salts. Such oxidizing agents can preferably include alkali metal, alkaline earth metal and/or ammonium persulfates together with alkali metal, alkaline earth metal and/or ammonium carbonates sesquicarbonate and/or bicarbonates, such as those compositions disclosed in European Patent Application EP 0 585 955 A1 (assigned to Hercules Incorporated and discussed above) and WO 94/20682 A1 (also discussed above). EP 0 585 955 A1 and WO 94/20682 A1 are hereby incorporated by reference, as though set forth in full herein. Preferably, the oxidizing agents comprise about 75% alkaline metal persulfates, e.g., sodium persulfate, in combination with about 25% other inorganic salts.

The invention is particularly suitable for accelerating the action of KYBREAK 100, KYBREAK 200 and KYBREAK 300.

Other oxidizing agents which can be suitably employed in the present invention include, but are not limited to, agents based on persulfate such as SPECIAL AD, manufactured by Solvox Manufacturing Co., of Milwaukee, Wis., and INSTAPULP P, available from Constant Labs, Montreal, Quebec, Canada, which is based on sodium persulfate and calcium chloride.

The oxidizing agent is employed in a manner well known to those of ordinary skill in the repulping art. Preferably, the oxidizing agent is employed in amounts of from about 0.5% to about 10%, with from about 1% to about 6%, being preferred, and about 2% to about 6% being most preferred (the foregoing amounts being based on the dry weight of the paper to be repulped).

Details of how to conduct repulping operations, including the amount of oxidizing agent to employ are known to those of ordinary skill in the art. Details and optimization of routine parameters can be found, for example, in *Pulp and Paper, Chemistry and Chemical Technology*, Casey, James P. (editor), J. Wiley, 3d. edition (1980), the entire disclosure of which is hereby incorporated by reference, as though set forth in full herein.

In preferred process aspects of the invention, a suspension is formed comprising the paper or cellulose-containing product to be repulped. Preferably, the paper or cellulosic product, generally in the form of discrete pieces of paper or cellulosic product to be repulped, is suspended in an aqueous solution of a suitable oxidizing agent, such as those listed above, to commence the repulping process by forming the suspension. Any size pieces can be employed, so long as the pieces are capable of being suspended in the repulping medium and the resultant suspension is capable of being handled by conventional repulping equipment.

Preferred conditions for the present invention include those wherein an acidic environment is employed in the suspension. Thus, the invention can advantageously be conducted under conditions wherein the pH of the suspension is in the range of from about 2.3 to about 6.5, preferably from about 3.6 to about 5.8, more preferably from about 4.8 to about 5.8, more preferably about 5.0 to about 5.5.

Preferably, the foregoing pH conditions are maintained throughout substantially the entire repulping process. Those of ordinary skill in the art will readily understand that the phrase "throughout substantially the entire repulping process" refers to a portion of the repulping process commencing at the initiation of repulping and continuing until the repulping process has reached any desired stage of completion, and preferably is substantially advanced or complete. For example, initiation of repulping refers to the beginning stages of the repulping process, preferably at or before the initial or beginning of breakdown of paper into smaller particles, such as flakes or fibers. The repulping process can be terminated at any stage, as desired. The repulping process is considered to be substantially advanced or complete at or near a stage of completion of the repulping cycle for the particular process employed and the particular paper or paper product being repulped, such as disassociation into individual flakes or fibers, up to and including disassociation into the discrete particles or fibers similar to or equivalent to those which made up the original pulp from which the paper or paper product was originally manufactured. Those of ordinary skill in the art will therefore also readily understand that the degree to which a particular paper or paper product (or paper product containing cellulosic fibers) should be repulped depends in large measure on the components and consistency of the original pulp from which the paper or paper product was manufactured. Of course, those of ordinary skill in the art will also readily understand that the components and consistency of the original pulp from which the paper or paper product was manufactured can be readily ascertained by those of ordinary skill in the art, such as by examining the paper, paper product, or paper product containing cellulosic material (or paper product containing cellulosic fibers) and/or by referring to known standards.

It has been found that the invention is most advantageously conducted in the presence of a buffer, also referred to herein as a buffer system.[1] The most preferred buffer system is an acetate salt/acetic acid buffer system, preferably a sodium acetate/acetic acid buffer system. Other suitable buffer systems include, but are not limited to succinic acid/sodium hydroxide, aconitic acid/sodium hydroxide, and citric acid/sodium citrate.

[1] As used herein, the terms "buffer" and "buffer system" are synonymous. A buffer is defined as a substance which, when in solution, resists but does not abolish changes in the pH of that solution caused by the addition of acids or alkali. Alternatively, a buffer is a substance which by its presence in solution increases the amount of acid or alkali that must be added to cause a change of 1 pH unit. For example, 1 ml of 1 M HCl added to 1 L $H_2O$ will lower the pH from 7 to 3, a change of 4 units, while the addition of 1 ml of 1 M NaOH to 1 L $H_2O$ will raise the pH from 7 to 11. However, a buffer will have a dramatic effect on the solution. Thus, 1 ml of 1 M HCl or 1 M NaOH added to 1 L $H_2O$ that contains 0.05 M imidazolinium HCl and 0.047 M imidazole (a standard buffer) will only change the pH by 0.02 unit.

Examples of other suitable buffers include, but are not limited to, the following:

citric acid/phosphate phosphate buffer imidazole/HCl potassium hydrogen phthalate/NaOH sodium cacodylate/HCl maleic acid/Tris-(hydroxymethylaminomethane)/NaOH sodium hydrogen maleate/NaOH phenylacetic acid/sodium phenylacetate sodium acetate/Acetic acid succinic acid/NaOH citric acid/sodium citrate formic acid/sodium formate 3,3-dimethylglutaric acid/sodium hydroxide citric acid/sodium hydroxide aconitic acid/sodium hydroxide boric acid/phosphoric acid/phenylacetic acid acetic acid/phenolsulphonic acid/phosphoric acid boric acid/citric acid/diethylbarbituric-acid/phosphoric acid boric acid/phosphoric acid/phthalic acid boric acid/citric acid/phosphoric acid carbonic acid/citric acid/phosphoric acid/2-amino-2-methyl-propane-1,3-diol.

Mixtures of the foregoing may also be employed.

These buffers are listed, and guidance and direction for their use may be found in *Buffers for pH and Metal Ion Control*, by D. D. Perrin and B. Dempsey, Chapman and Hall, London (1974), which is hereby incorporated by reference as though set forth in full herein.

When an acetic acid/sodium acetate buffer system is employed, a pH of about 3.6 can be maintained by employing a buffer system prepared from a stock solution comprising about 46.3 ml. of about 0.2 molar acetic acid and about 3.7 ml. of about 0.2 molar sodium acetate; a pH of about 5.6 can be maintained by employing a buffer system prepared from a stock solution comprising about 4.8 ml. of about 0.2 molar acetic acid and about 45.2 ml. of about 0.2 molar sodium acetate.

In general, to provide a starting solution, buffer stock solution as described above is diluted with water to provide a solution having a concentration of buffer system (e.g., a concentration of buffer salt and acid) of about 0.01–0.1 molar concentration. Preferably, suitable buffer systems are formulated by preparing a stock solution such as those discussed immediately above. This stock solution is then diluted with water to arrive at the desired pH value. Suitable dilution values can be readily determined by those of ordinary skill in the art, and solutions for commercial applications can be readily prepared based on the foregoing guidelines. For example, suitable buffer systems for commercial use can be prepared from about 14.76 lbs. of acetic acid, about 1000 gallons of water and about 47.98 lbs. of sodium acetate.

The oxidizing agent, and optional materials, such as the optional salts discussed above, are then added to make up the repulping stock solution or starting solution. Preferably, oxidizing agent is added to such a solution in amounts up to the saturation point. The cellulosic material is then added to this starting solution and repulping is conducted.

When KYBREAK 100, KYBREAK 200 or KYBREAK 300 is employed as the oxidizing agent, it is employed in amounts of about 2% based on the weight of cellulosic fibers (or wood pulp) in the product to be repulped. Thus, for example, about 0.4 g of KYBREAK is employed per about 20 g of wood pulp, about 0.6 g of KYBREAK is employed per about 30 g of wood pulp, etc.

The buffer systems are suitably prepared under conditions well known to those of ordinary skill in the art of buffer systems and buffer preparation. For example, suitable buffers and buffer systems can be prepared by following directions set forth in standard reference textbooks, such as by following the directions set forth in *Buffers for pH and Metal Ion Control*, by D. D. Perrin and B. Dempsey, Chapman and Hall, London (1974), cited above.

Additionally proteolytic enzymes can be optionally employed. Suitable proteolytic enzymes include, but are not limited to protease, pronase, trypsin, chymotrypsin, bromelain, pepsin, collagenase, and papain.

Preferably, processes of the invention are conducted at a temperature in the range of from about 20° C. to about 90° C., preferably from about 25° C. to about 80° C., and most preferably from about 40° C. to about 70° C.

The processes of the invention can be conducted batchwise, continuously or semi-continuously and can be readily so modified by those of ordinary skill in the art.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

The following procedure was employed for making the paper used for the repulping test. The paper was made from a 70:30 blend of James River Burgess Hardwood Kraft and Rayonier Bleached Softwood Kraft on the KALAMZOO LAB FORMER and refined to 434 cc CSF ("Canadian Standard Freeness"). The dilution water was standard hard water (50 ppm alkalinity and 100 ppm hardness); the stock chest pH was 7.5. 0.5% KYMENE 557H was added. The paper basis weight was 42.1 lbs/ream (24×36– 500), dry tensile strength was 27.5 lbs/in and wet tensile strength was 5.52 lbs/in.

Repulping tests were carried out according to TAPPI (Technical Association of the Pulp and Pater Industry) Method T-205-OS71. A 20 g sample of paper as made according to the procedure above, cut into 1" square pieces, was suspended in 1500 ml of preheated demineralized water at 40° C. The reagents were added (0.4 g Kybreak 200 and 100 ml buffer solution I) and the mixture was agitated at 3000 rpm. Small samples of slurry (8–10 ml) were withdrawn after 5, 10, 15, 20, 30, 40, 50 and 60 minutes. The slurry samples were diluted to approximately 200 ml and compared with standard samples at different stages of repulping. Progress was expressed on a scale of 1 to 6, where 1 is intact paper and 6 is complete defibering.

Buffer solution I (BI): Sodium Acetate/Acetic Acid (pH 5.0)

14.8 ml 0.2 M acetic acid
35.2 ml 0.2 M sodium acetate
50 ml demineralized water Table I data indicate that the repulping time of KYMENE 557H containing paper with KYBREAK 200 is reduced in the presence of acetic acid/sodium acetate buffer at pH 5.5 (Experiment 3 compared to 2).

EXAMPLE 2

Example 1 was repeated using different buffer systems.

Buffer solution II (BII): Potassium Hydrogen Phthalate/Sodium Hydroxide (pH 5.0)

50 ml 0.1 M potassium hydrogen phthalate
22.6 ml 0.1 M acetic acid
27.4 ml demineralized water Buffer solution III (BIII): Phosphate Buffer (pH 7.4)

40.5 ml 0.2 M $Na_2HPO_4$
9.5 ml 0.2 M $NaH_2PO_4$
50.0 ml demineralized water

Data from Table II indicate that the sodium acetate/acetic acid buffer (Buffer I) at pH 5.4 is much more efficient than the phthalate buffer (Buffer II) even though the pH of both examples is the same (Experiment 7 and 8). The buffer system I is also more efficient than the phosphate buffer (Buffer III) at pH 7.6 and the phosphate buffer in the presence of sodium acetate (Experiment 7 compared to 9 and 10).

EXAMPLE 3

Example 1 was repeated, except the repulping was performed at 25, 40 and 80° C. The resulting data show that increasing temperature decreased repulping time (Table III).

EXAMPLE 4

Example 1 was repeated, except that KYBREAK 200 was compared to OXONE (a repulping agent manufactured by DuPont, and comprising about 43% potassium peroxymonosulfate, about 23% sodium bisulfate, about 32% potassium sulfate and about 2% magnesium carbonate). Repulping was performed in demineralized water and the presence of the acetic acid/sodium acetate buffer (pH 5.0). The resulting data, shown in Table IV indicate that the buffer system does not improve the performance of OXONE (Experiment 16 compared to 17).

EXAMPLE 5

Example 1 was repeated, except that a new sample of KYMENE-containing paper was used for the experiments. The paper was made as described in Example 1. Its basis weight was 42.0 lbs/ream (24×36–500), dry tensile strength was 29.7 lbs/in, and wet tensile strength was 5.38 lbs/in.

The effect of the acetic acid/sodium acetate buffer was evaluated on sodium persulfate in the presence of carbonate salts and copper sulfate. Table V data indicate that the acetate buffer increased the repulping rate of simulated KYBREAK. They also suggest that the nature of the carbonate salts is not critical in the presence of the acetate buffer.

EXAMPLE 6

The paper was the same used as in Example 1. An alternative repulping test was used as follows:

30 g of paper was cut in 1-inch square pieces and soaked in 1970 ml of demineralized water in a TAPPI standard disintegrator for 15 minutes at 50° C. Kybreak and buffer solution were added to the slurry at the beginning of the soaking period. The slurry was then repulped at 3000 rpm for a preset period of time (5 and 15 minutes). The temperature was maintained at 50° C. A 300 ml aliquot of slurry was removed, pH was measured, and the slurry was added to the water-filled Somerville fractionating unit, which was run for 10 minutes. The water was drained, the rejects (unrepulped fraction) and the accepts (fully repulped fibers) were collected, dried and weighed. Repulpability is reported as % fiber. It is calculated as 100 times the accepts weight divided by the sum of the accepts and rejects weight.

Data similar to that shown in Table I are given in Table VI, using this test method. For the sample containing buffer, 100 ml of buffer solution I is substituted for 100 ml of the 1970 ml of demineralized water. For experiments 28–31, 0.6 g Kybreak 200 is added. The data confirmed the finding of example 1 that the repulping time required is reduced when the buffer I system is used.

EXAMPLE 7

The paper and repulping test are those indicated in Example 6. The data in Table VII indicate that the action of KYBREAK 300 (experiments 41 and 42) is accelerated by the buffer in a manner similar to KYBREAK 200. Again, the action of Oxone is not accelerated by the buffer and is similar to that in demineralized water (experiments 43–46).

EXAMPLE 8

Example 6 is repeated, except that the amount of buffer was reduced, with demineralized water added to compensate for the volume. The results are reported as Experiments 46–51 in Table VIII. For comparison, the data of Experiments 28–31 of Example 6 are reproduced again in Table VIII. As shown in Table VIII, 75 ml of BI and 25 ml of DW are employed in Experiments 46 and 47, as opposed to 100 ml of BI for Experiments 30 and 31. Similarly, 50 ml of BI and 50 ml of DW are employed in Experiments 48 and 49, and 10 ml BI and 90 ml of DW are employed in Experiments 50 and 51. The results suggest that a reduced amount of buffer, which maintains the somewhat higher pH, has a beneficial, albeit lesser, effect on repulping.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE I

| Experiment | Description[a,b] | pH (initial) | Degree of Repulping[c] | | | | | |
|---|---|---|---|---|---|---|---|---|
| | | | 10 min | 20 | 30 | 40 | 50 | 60 |
| 1 | Demineralized water (Control) | 7.5 | 1 | 1 | 2 | 3 | 4 | 4 |
| 2 | KYBREAK 200 (0.4 g) in Demineralized Water | 9.6 | 2 | 3 | 3 | 3 | 4 | 4 |
| 3 | KYBREAK 200 (0.4 g) in Buffer Solution I | 5.5 | 3 | 5 | 6 | | | |

[a]Experiments run at 40° C.
[b]Buffer Solution I = sodium acetate/acetic acid buffer, (pH 5.0).
[c]Repulped by TAPPI method T-205-0S71; degree of pulping on a scale of 1 to 6, with 6 indicating complete repulping.

TABLE II

| Experiment | Description[a] | pH (initial) | T (°C.) | Degree of Repulping[c] | | | | | |
|---|---|---|---|---|---|---|---|---|---|
| | | | | 10 min | 20 | 30 | 40 | 50 | 60 |
| 4 | Control[b]/DW | 7.5 | 40 | 1 | 1 | 2 | 3 | 4 | 4 |
| 5 | Control[b]/BI | 4.9 | 40 | 2 | 3 | 3 | 3 | 4 | 4 |
| 6 | KYBREAK/DW | 9.6 | 40 | 2 | 3 | 3 | 3 | 4 | 4 |
| 7 | KYBREAK/BI | 5.5 | 40 | 3 | 5 | 6 | | | |
| 8 | KYBREAK/BII | 5.5 | 40 | 3 | 4 | 5 | 5 | 5 | 6 |
| 9 | KYBREAK/BIII | 7.6 | 40 | 2 | 4 | 4 | 5 | 5 | 6 |
| 10 | KYBREAK/BIII with added sodium acetate (35.2 ml of .2 molar sodium acetate) | 7.5 | 40 | 2 | 3 | 4 | 5 | 5 | 6 |

[a]BI = Sodium acetate/acetic acid buffer (pH 5.0)
BII = Phthalate buffer (pH 5.0)
BIII = Phosphate buffer (pH 7.0)
DW = Demineralized water
[b]No KYBREAK
[c]Repulped by TAPPI method T-205-OS71; degree of repulping on a scale of 1 to 6, with 6 indicating complete repulping.

TABLE III

| Experiment | Description[a] | pH (initial) | T (°C.) | Degree of Repulping[b] | | | | | |
|---|---|---|---|---|---|---|---|---|---|
| | | | | 10 min | 20 | 30 | 40 | 50 | 60 |
| 11 | KYBREAK/DW | 9.6 | 40 | 2 | 3 | 4 | 5 | 5 | 5 |
| 12 | KYBREAK/BI | 5.8 | 25 | 1 | 1 | 2 | 3 | 4 | 5 |
| 13 | KYBREAK/BI | 5.8 | 40 | 3 | 5 | 6 | | | |
| 14 | KYBREAK/BI | 5.8 | 80 | 5 | 6 | | | | |

[a]BI = Sodium acetate/acetic acid buffer (pH 5.0)
DW = Demineralized water
[b]Repulped by TAPPI method T-205-0S71; degree of repulping on a scale of 1 to 6, with 6 indicating complete repulping.

TABLE IV

| Experiment | Description[a] | pH (initial) | T (°C.) | Degree of Repulping[b] | | | | | |
|---|---|---|---|---|---|---|---|---|---|
| | | | | 10 min | 20 | 30 | 40 | 50 | 60 |
| 11 | KYBREAK/DW | 9.6 | 40 | 2 | 3 | 4 | 5 | 5 | 5 |
| 15 | KYBREAK/BI | 5.8 | 40 | 3 | 5 | 6 | | | |
| 16 | OXONE/DW | 3.6 | 40 | 1 | 1 | 2 | 3 | 3 | 3 |
| 17 | OXONE/BI | 5.0 | 40 | 1 | 1 | 2 | 2 | 3 | 3 |

[a]BI = Sodium acetate/acetic acid buffer (pH 5.0)
DW = Demineralized water
[b]Repulped by TAPPI method T-205-0S71; degree of repulping on a scale of 1 to 6, with 6 indicating complete repulping.

TABLE V

| Experiment | Description[a] | pH (initial) | T (°C.) | Degree of Repulping[b] | | | | | |
|---|---|---|---|---|---|---|---|---|---|
| | | | | 10 min | 20 | 30 | 40 | 50 | 60 |
| 18 | KYBREAK/DW | 9.6 | 40 | 2 | 3 | 4 | 5 | 5 | 5 |
| 19 | KYBREAK/BI | 5.8 | 40 | 3 | 3 | 5 | 5 | 5 | 6 |
| 20 | SP-C-CS/DW | 9.6 | 40 | 2 | 3 | 4 | 4 | 5 | 6 |
| 21 | SP-C-CS/BI | 5.7 | 40 | 2 | 5 | 5 | 5 | 6 | |
| 22 | SP-BC-CS/DW | 7.7 | 40 | 2 | 4 | 5 | 6 | | |
| 23 | SP-BC-CS/BI | 5.6 | 40 | 2 | 4 | 5 | 5 | 6 | |
| 24 | SP-SC-CS/DW | 9.2 | 40 | 2 | 3 | 4 | 4 | 5 | 6 |
| 25 | SP-SC-CS/BL | 5.4 | 40 | 3 | 5 | 5 | 5 | 6 | |

[a]BI = Sodium acetate/acetic acid buffer (pH 5.0)
DW = Demineralized water
SP = Sodium persulfate
C = Sodium carbonate
BC = Sodium bicarbonate
SC = Sodium sesquicarbonate
CS = Copper sulfate. Therefore the data of experiments 20–25 demonstrate that the invention increases the rate of repulping beyond that of copper sulfate
[b]Repulped by TAPPI method T-205-OS71; degree of repulping on a scale of 1 to 6, with 6 indicating complete repulping.

TABLE VI

| Experiment | Description[a,b] | Repulping[d] | | |
|---|---|---|---|---|
| | | pH[c] | Time (min) | % Fiber Recovery |
| 26 | Demineralized water | 7.0 | 5 | 11.2 |
| 27 | Demineralized water | 7.0 | 15 | 35.0 |
| 28 | KYBREAK 200/DW | 9.7 | 5 | 11.4 |
| 29 | KYBREAK 200/DW | 9.5 | 15 | 38.5 |
| 30 | KYBREAK 200/BI | 5.3 | 5 | 61.3 |
| 31 | KYBREAK 200/BI | 5.3 | 15 | 99.5 |

[a]DW = Demineralized water
BI = Sodium acetate/acetic acid buffer (pH 5.0)
[b]Experiments conducted at 50° C.
[c]pH after repulping.
[d]Repulping method described in example 6.

TABLE VII

| Experiment | Description[a,b] | Repulping[d] | | |
|---|---|---|---|---|
| | | pH[c] | Time (min) | % Fiber Recovery |
| 32 | Demineralized water | 6.5 | 5 | 12.9 |
| 33 | Demineralized water | 7.0 | 15 | 32.9 |
| 34 | KYBREAK 200/DW | 9.6 | 5 | 13.6 |
| 35 | KYBREAK 200/DW | 9.6 | 15 | 44.1 |
| 36 | KYBREAK 200/BI | 5.3 | 5 | 48.6 |
| 37 | KYBREAK 200/BI | 5.2 | 15 | 96.1 |
| 38 | KYBREAK 300/DW | 9.2 | 5 | 12.2 |
| 39 | KYBREAK 300/DW | 9.2 | 15 | 39.1 |
| 40 | KYBREAK 300/BI | 5.1 | 5 | 50.3 |
| 41 | KYBREAK 300/BI | 5.0 | 15 | 97.1 |
| 42 | OXONE/DW | 3.4 | 5 | 21.2 |
| 43 | OXONE/DW | 3.4 | 15 | 61.5 |
| 44 | OXONE/BI | 5.0 | 5 | 16.9 |
| 45 | OXONE/BI | 5.0 | 15 | 51.3 |

[a]DW = Demineralized water
BI = Sodium acetate/acetic acid buffer (pH 5.0)
[b]Experiments run at 50° C.
[c]pH after repulping.
[d]Repulping method described in Example 6.

TABLE VIII

| Experiment | Description[a,b] | Repulping[d] | | |
|---|---|---|---|---|
| | | pH[c] | Time (min) | % Fiber Recovery |
| 28 | Kybreak 200/DW | 9.7 | 5 | 11.4 |
| 29 | Kybreak 200/DW | 9.5 | 15 | 38.5 |
| 30 | Kybreak 200/100 ml BI | 5.3 | 5 | 61.3 |
| 31 | Kybreak 200/100 ml BI | 5.3 | 15 | 99.5 |
| 46 | Kybreak 200/75 ml BI | 7.6 | 5 | 17.7 |
| 47 | Kybreak 200/75 ml BI | 7.6 | 15 | 64.9 |
| 48 | Kybreak 200/50 ml BI | 8.4 | 5 | 11.8 |
| 49 | Kybreak 200/50 ml BI | 8.4 | 15 | 56.2 |
| 50 | Kybreak 200/10 ml BI | 9.6 | 5 | 6.1 |
| 51 | Kybreak 200/10 ml BI | 9.6 | 15 | 35.4 |

[a]DW = Demineralized water
BI = Sodium acetate/acetic acid buffer (pH 5.0)
[b]Experiments conducted at 50° C.
[c]pH after repulping.
[d]Repulping method described in example 6.

What is claimed is:

1. A process of repulping a paper product comprising a wet strength resin comprising a polyamide-epichlorohydrin resin or polyamine-epichlorohydrin resin and cellulose fibers, comprising forming an aqueous suspension of paper product comprising said wet strength resin, and cellulose fibers to be repulped and an oxidizing agent comprising at least one persulfate salt, and repulping said paper product in the presence of a buffer effective to maintain said suspension at a pH in a range of from about 2.3 to about 6.5.

2. The process of claim 1, conducted under conditions wherein the pH of said suspension is maintained in the range of from about 3.6 to about 5.8.

3. The process of claim 2, conducted under conditions wherein the pH of said suspension is maintained in the range of from about 4.8 to about 5.8.

4. The process of claim 3, wherein said pH of said suspension is maintained in the range of from about 5.0 to about 5.5.

5. The process of claim 1 wherein said buffer comprises an acetate salt and acetic acid.

6. The process of claim 1 wherein said buffer is capable of maintaining the pH of said suspension in the range of from about 3.6 to about 5.8.

7. The process of claim 5, wherein said acetate salt comprises sodium acetate.

8. The process of claim 1, wherein said at least one persulfate salt comprises a member selected from the group consisting of alkali metal persulfates, alkaline earth metal persulfates and mixtures thereof.

9. The process of claim 8, wherein said at least one persulfate salt comprises a member selected from the group consisting of sodium persulfate, calcium persulfate and mixtures thereof.

10. The process of claim 9, wherein said at least one persulfate salt comprises sodium persulfate.

11. The process of claim 8, wherein said product comprising cellulose fibers comprises a member selected from the group consisting of wet strength paper, paper board, broke, and mixtures thereof.

12. The process of claim 11, wherein said product comprising cellulose fibers comprises wet strength paper.

13. The process of claim 11, wherein said product comprising cellulose fibers comprises paper board.

14. The process of claim 11, wherein said product comprising cellulose fibers comprises broke.

15. The process of claim 1, wherein said repulping is conducted in the presence of an additional salt comprising a member selected from the group consisting of an alkali metal, alkaline earth metal or ammonium salt of carbonate, bicarbonate or sesquicarbonate, and mixtures thereof.

16. The process of claim 1, wherein said repulping is conducted at a temperature in the range of from about 20° C. to about 90° C.

17. The process of claim 16, wherein said temperature range is from about 25° C. to about 80° C.

18. The process of claim 17, wherein said temperature range is from about 40° C. to about 70° C.

19. The process of claim 1 wherein said buffer comprises a member selected from the group consisting of citric acid/phosphate; phosphate buffer; imidazole/HCl; potassium hydrogen phthalate/NaOH; sodium cacodylate/HCl; maleic acid/Tris(hydroxymethylaminomethane)/NaOH; sodium hydrogen maleate/NaOH; phenylacetic acid/sodium phenylacetate; sodium acetate/acetic acid; succinic acid/NaOH; citric acid/sodium citrate; formic acid/sodium formate; 3,3-dimethylglutaric acid/sodium hydroxide; citric acid/sodium hydroxide; aconitic acid/sodium hydroxide; boric acid/phosphoric acid/phenylacetic acid; acetic acid/phenolsulphonic acid/phosphoric acid; boric acid/citric acid/diethylbarbituric acid/phosphoric acid; boric acid/phosphoric acid/phthalic acid; boric acid/citric acid/phosphoric acid; carbonic acid/citric acid/phosphoric acid/2-amino-2-methyl-propane-1,3-diol; and mixtures thereof.

20. A process of repulping a wet strength paper product comprising cellulose fibers and wet strength resin comprising a polyamide-epichlorohydrin resin or polyamine-epichlorohydrin resin, comprising forming an aqueous suspension of wet strength paper product comprising cellulose fibers to be repulped and wet strength resin, treating said suspension with an oxidizing agent effective to degrade a wet strength resin comprising at least one persulfate salt, and conducting said treating in the presence of a buffer effective to maintain the pH of said aqueous suspension in a range of from about 2.3 to about 6.5 to obtain repulping of the wet strength paper product.

21. The process of claim 20, wherein said treating is conducted under conditions wherein the pH of said suspension is maintained in the range of from about 3.6 to about 5.8.

22. The process of claim 21, wherein said treating is conducted under conditions wherein the pH of said suspension is maintained in the range of from about 4.8 to about 5.8.

23. The process of claim 22, wherein said pH of said suspension is maintained in the range of from about 5.0 to about 5.5.

24. The process of claim 20, wherein said buffer comprises an acetate salt and acetic acid.

25. The process of claim 24, wherein said acetate salt comprises sodium acetate.

26. The process of claim 20, wherein said at least one persulfate salt comprises a member selected from the group consisting of alkali metal persulfate, alkaline earth metal persulfate and mixtures thereof.

27. The process of claim 26, wherein said at least one persulfate salt comprises a member selected from the group consisting of sodium persulfate, calcium persulfate and mixtures thereof.

28. The process of claim 27, wherein said at least one persulfate salt comprises sodium persulfate.

29. The process of claim 20, wherein said buffer comprises a member selected from the group consisting of citric acid/phosphate; phosphate buffer; imidazole/HCl; potassium hydrogen phthalate/NaOH; sodium cacodylate/HCl; maleic acid/Tris(hydroxymethylaminomethane)/NaOH; sodium hydrogen maleate/NaOH; phenylacetic acid/sodium phenylacetate; sodium acetate/acetic acid; succinic acid/NaOH; citric acid/sodium citrate; formic acid/sodium formate; 3,3-dimethylglutaric acid/sodium hydroxide; citric acid/sodium hydroxide; aconitic acid/sodium hydroxide; boric acid/phosphoric acid/phenylacetic acid; acetic acid/phenolsulphonic acid/phosphoric acid; boric acid/citric acid/diethylbarbituric acid/phosphoric acid; boric acid/phosphoric acid/phthalic acid; boric acid/citric acid/phosphoric acid; carbonic acid/citric acid/phosphoric acid/2-amino-2-methyl-propane-1,3-diol; and mixtures thereof.

30. The process of claim 20, wherein said repulping is conducted in the presence of an additional salt comprising a member selected from the group consisting of an alkali metal, alkaline earth metal or ammonium salt of carbonate, bicarbonate or sesquicarbonate, and mixtures thereof.

31. The process of claim 20, wherein said repulping is conducted at a temperature in the range of from about 20° C. to about 90° C.

32. The process of claim 31, wherein said temperature range is from about 25° C. to about 80° C.

33. The process of claim 32, wherein said temperature range is from about 40° C. to about 70° C.

* * * * *